A. E. FRAEDRICH.
COUPLING FOR TRACTION ENGINES.
APPLICATION FILED DEC. 3, 1912.

1,129,188.

Patented Feb. 23, 1915.

Witnesses
M. F. Gannett
James A. Koehl

Inventor
Albert E. Fraedrich
By Victor J. Evans
Attorney

UNITED STATES PATENT OFFICE.

ALBERT E. FRAEDRICH, OF GREENHORN, OREGON.

COUPLING FOR TRACTION-ENGINES.

1,129,188.     Specification of Letters Patent.     Patented Feb. 23, 1915.

Application filed December 3, 1912. Serial No. 734,778.

*To all whom it may concern:*

Be it known that I, ALBERT E. FRAEDRICH, a citizen of the United States, residing at Greenhorn, in the county of Baker and State of Oregon, have invented new and useful Improvements in Couplings for Traction-Engines, of which the following is a specification.

This invention relates to couplings for traction engines; and it has for an object to provide means whereby a farm implement can be readily connected with or disconnected from the traction engine as the occasion may demand.

Another object of the invention is to provide means for holding the coupling positively locked against uncoupling from the implement with which it is connected.

Figure 1:
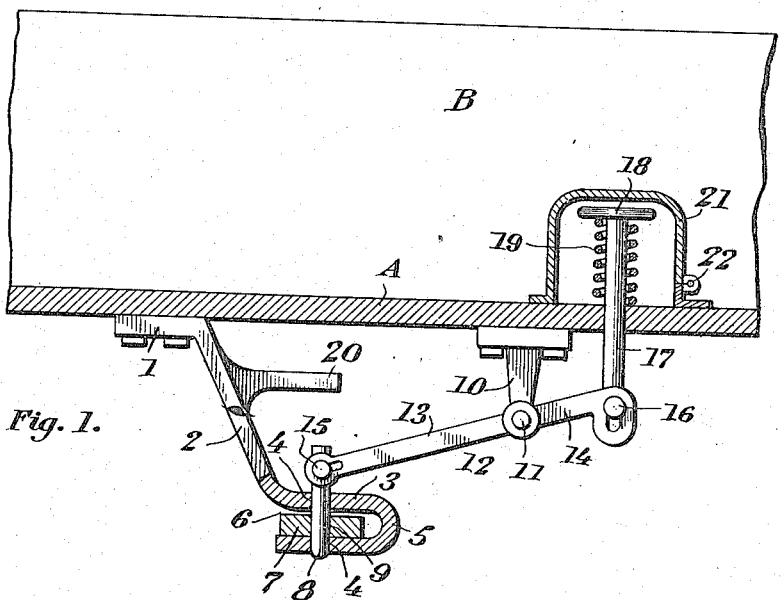
Figure 2:
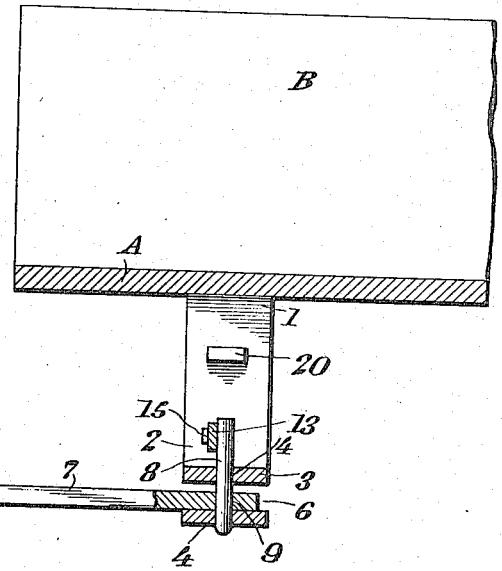

In the drawing forming a portion of this application, and in which like letters of reference indicate similar parts in the several views:—Figure 1 is a longitudinal section through a portion of the traction engine showing the application of the coupling implement thereto and illustrating the manner of connecting the latter with a farm implement. Fig. 2 is a transverse section through the platform of the traction engine showing the application of the coupling thereto.

The traction engine B herein conventionally shown, is provided with a platform A, to which is securely connected a bracket 1 having a downwardly-extending portion 2, which is terminally formed to provide superimposed clevis-forming plates 3, which have alined openings 4 therein, the said plates being spaced relatively and connected through a return bend 5 at one end while at the opposite end the plates are free relatively to provide a lateral entrance passage 6 for the draw-bar 7.

The coupling pin 8 herein shown is mounted to slide vertically in the alined passages 4 and to engage in the receiving passage 9 of the draw-bar. A second bracket 10 depends from the platform A and is disposed immediately at one side of the vertical center of the coupling pin, being pivotally connected at 11 with a controlling lever 12. This lever is provided with a relatively long extension 13 and a short extension 14, the former having pivotal connection at 15 with the pin 8. The arrangement of the lever is such that the weight of the long extension 13 thereof will be contributed to the coupling pin 8, whereby to assist in holding said pin against casual derangement from the draw-bar. The short arm 14 of the lever 12 is pivotally connected at 16 with an actuating bar 17 of a foot treadle 18. The bar 17 is adapted to slide vertically in the platform A, and as shown said bar, at a point above the platform, is embraced by a spring 19 which exerts its pressure against the treadle 18, whereby to normally hold the coupling pin in an operative coupled position. The weight of the extension 13 of the lever 12 adds to the efficiency of the spring in holding the pin 8 in the described coupled position with the draw-bar.

With a view to preventing the coupling pin from being entirely withdrawn from the clevis portion of the bracket 1, I provide the extension 2 of the bracket with a horizontal stop 20, which is located in the direct path of upward movement of the coupling pin whereby to engage therewith when the treadle 18 is depressed to a certain degree of its movement. The distance between the upper end of the pin and the stop 20 slightly exceeds the distance between the superimposed plates of said clevis portion so as to prevent the escape of the pin from the uppermost plate 3. A guard casing 21 is mounted for swinging adjustment at 22 upon the platform and positioned with relation to the actuating treadle, whereby it may be adjusted thereover as illustrated in Fig. 1 to prevent the operator from accidentally stepping on the treadle when moving into different positions upon the platform.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

The herein described coupling for traction engines comprising a platform, a bracket secured thereto and depending therefrom and provided with a clevis and also with a stop arm above the clevis, a second bracket attached to the platform, a controlling lever pivoted to the second bracket, a coupling pin pivotally connected to said lever and mounted for vertical sliding movement in the clevis, a treadle having a rod extending down through an opening in the platform and pivotally connected to the outer end of the controlling lever and the spring arranged between the platform and treadle and exerting its tension to normally hold the lever with the coupling pin in coupled position.

In testimony whereof I affix my signature in presence of two witnesses.

ALBERT E. FRAEDRICH.

Witnesses:
E. G. STEVENSON,
A. M. McFOLKESETH.